US012695164B2

(12) United States Patent
Dunlap

(10) Patent No.: US 12,695,164 B2
(45) Date of Patent: Jul. 28, 2026

(54) BATTERY PACK TERMINAL RETENTION SYSTEM INCLUDING GROUP OF TAB TERMINALS SECURED TO PORTION OF BUSBAR AND ANOTHER GROUP OF TAB TERMINALS SECURED TO ANOTHER PORTION, AND METHOD OF USINGTHE SAME

(71) Applicant: Ford Global Technologies, LLC, Dearborn, MI (US)

(72) Inventor: Brock Dunlap, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 600 days.

(21) Appl. No.: 18/183,356

(22) Filed: Mar. 14, 2023

(65) Prior Publication Data

US 2024/0079747 A1      Mar. 7, 2024

Related U.S. Application Data

(60) Provisional application No. 63/403,445, filed on Sep. 2, 2022.

(51) Int. Cl.
*H01M 50/566* (2021.01)
*H01M 10/0525* (2010.01)
*H01M 50/505* (2021.01)
*H01M 50/552* (2021.01)

(52) U.S. Cl.
CPC ..... *H01M 50/566* (2021.01); *H01M 10/0525* (2013.01); *H01M 50/505* (2021.01); *H01M 50/552* (2021.01); *H01M 2220/20* (2013.01)

(58) Field of Classification Search
CPC ............. H01M 50/566; H01M 50/505; H01M 50/552; H01M 10/0525
USPC ................ 429/156, 158, 159, 160, 163, 157
See application file for complete search history.

(56) References Cited

U.S. PATENT DOCUMENTS

| | | | |
|---|---|---|---|
| 10,903,473 B2 | 1/2021 | Guo et al. | |
| 11,171,391 B2 | 11/2021 | Dawley et al. | |
| 2013/0029206 A1 | 1/2013 | Lev | |
| 2018/0145294 A1* | 5/2018 | Choi | H01M 50/293 |
| 2019/0389318 A1* | 12/2019 | Lee | H01M 50/516 |
| 2020/0144582 A1* | 5/2020 | Guo | B23K 26/26 |
| 2020/0350547 A1* | 11/2020 | Chi | H01R 4/029 |

(Continued)

FOREIGN PATENT DOCUMENTS

JP         2001283824 A     10/2001

OTHER PUBLICATIONS

"Directly." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1240581. (Year: 2010).*

(Continued)

*Primary Examiner* — Sean P Cullen
(74) *Attorney, Agent, or Firm* — David B. Kelley; Carlson, Gaskey & Olds, P.C.

(57) ABSTRACT

A battery pack terminal retention system includes a busbar; a group of more than two first tab terminals secured directly to each other and to a first portion of the busbar; and a group of more than two second tab terminals secured directly to each other and to a different, second portion of the busbar.

18 Claims, 3 Drawing Sheets

(56) References Cited

U.S. PATENT DOCUMENTS

| | | | | |
|---|---|---|---|---|
| 2021/0074985 | A1* | 3/2021 | Dawley .............. | H01M 50/502 |
| 2022/0094022 | A1* | 3/2022 | Kim ................... | H01M 50/505 |

OTHER PUBLICATIONS

"Secure." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1288482. (Year: 2010).*

* cited by examiner

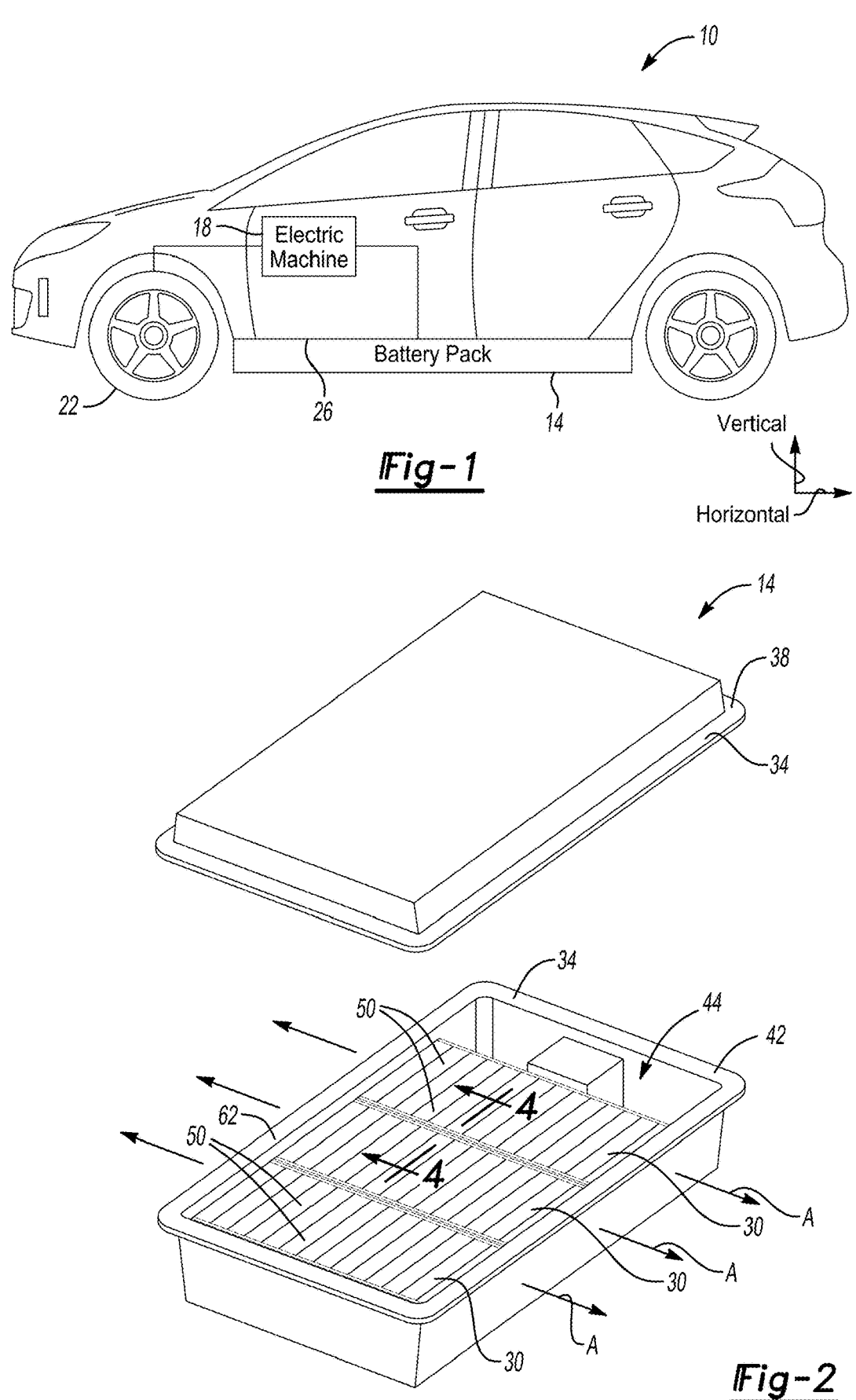
_Fig-1_
_Fig-2_

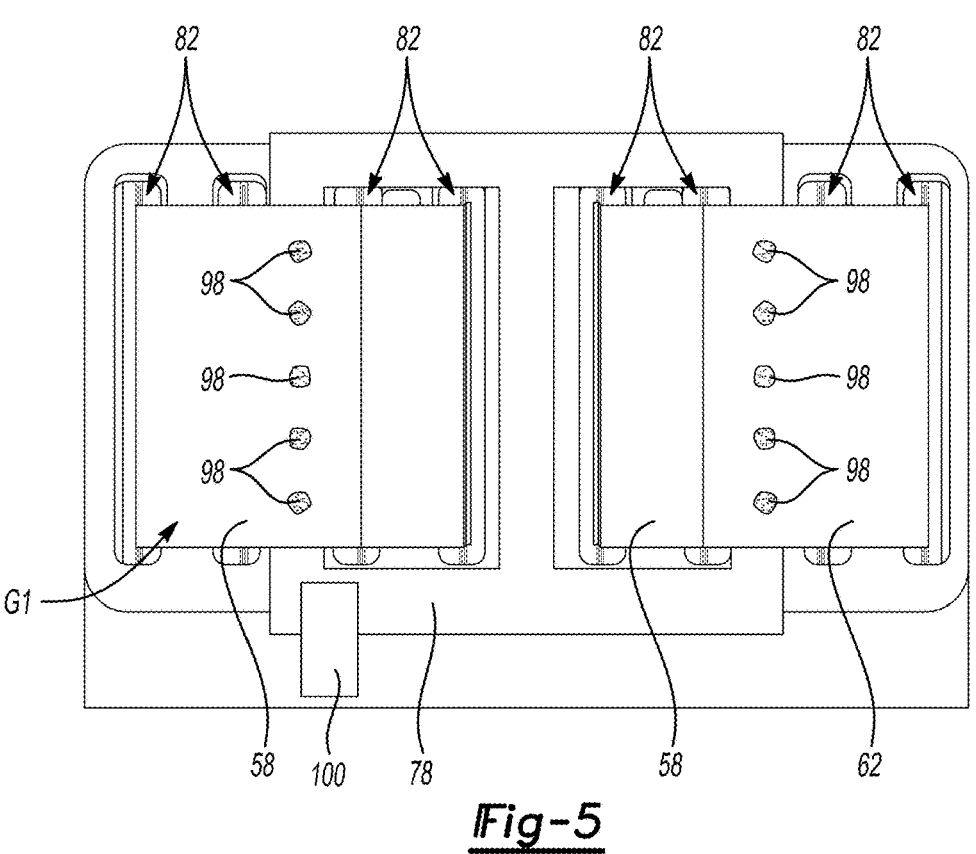
_Fig-5_
_Fig-6_
Vertical

BATTERY PACK TERMINAL RETENTION SYSTEM INCLUDING GROUP OF TAB TERMINALS SECURED TO PORTION OF BUSBAR AND ANOTHER GROUP OF TAB TERMINALS SECURED TO ANOTHER PORTION, AND METHOD OF USINGTHE SAME

CROSS-REFERENCE TO RELATED APPLICATIONS

This application claims priority to U.S. Provisional Application No. 63/403,445, which was filed on 2 Sep. 2022 and is incorporated herein by reference.

TECHNICAL FIELD

This disclosure relates generally to securing tab terminals of battery cells to different portions of a busbar.

BACKGROUND

A traction battery pack of an electrified vehicle can include groups of battery cells arranged in one or more cell stacks. The battery cells can include terminals, which are typically electrically connected to other terminals, a busbar, or both.

SUMMARY

In some aspects, the techniques described herein relate to a battery pack terminal retention system, including: a busbar; a group of more than two first tab terminals secured directly to each other and to a first portion of the busbar; and a group of more than two second tab terminals secured directly to each other and to a different, second portion of the busbar.

In some aspects, the techniques described herein relate to a battery pack terminal retention system, further including a cross-member, the busbar secured to the cross-member.

In some aspects, the techniques described herein relate to a battery pack terminal retention system, wherein the first tab terminals and second tab terminals extend through respective apertures in the cross-member when the first and second groups of tab terminals are secured to the busbar.

In some aspects, the techniques described herein relate to a battery pack terminal retention system, further including at least one heat stake securing the busbar to the cross-member.

In some aspects, the techniques described herein relate to a battery pack terminal retention system, wherein the cross-member is a composite material.

In some aspects, the techniques described herein relate to a battery pack terminal retention system, wherein the busbar includes a first aperture and a second aperture, at least some of first tab terminals extending through the first aperture when the group of first tab terminals are secured to the busbar, at least some of the second tab terminals extending through the second aperture when the group of second tab terminals are secured to the busbar.

In some aspects, the techniques described herein relate to a battery pack terminal retention system, wherein the tab terminals within the first and second groups of tab terminals each extend from a lithium-ion battery cell.

In some aspects, the techniques described herein relate to a battery pack terminal retention system, wherein the first portion of the busbar is a first vertically extending portion of the busbar, wherein the second portion of the busbar is a second vertically extending portion of the busbar.

In some aspects, the techniques described herein relate to a battery pack terminal retention system, wherein the group of more than two first tab terminals includes at least one first tab terminal folded over the first portion of the busbar in a first direction and at least one first tab terminal folded over the first portion of the busbar in an opposite, second direction, wherein the group of more than two second tab terminals includes at least one second tab terminal folded over the second portion of the busbar in the first direction and at least one second tab terminal folded over the second portion of the busbar in the second direction.

In some aspects, the techniques described herein relate to a battery pack terminal retention system, further including a sensor lead secured directly to the busbar.

In some aspects, the techniques described herein relate to a battery pack terminal retention method: securing a group of more than two first tab terminals directly to each other and to a first portion of a busbar; and securing a group of more than two second tab terminals directly to each other and to a second portion of a busbar.

In some aspects, the techniques described herein relate to a battery pack terminal retention method, further including securing the group of more than two first tab terminals to the first portion of the busbar using a first plurality of welds, and securing the group of more than two second tab terminals to the second portion of the busbar using a second plurality of welds In some aspects, the techniques described herein relate to a battery pack terminal retention method, wherein the first tab terminals and second tab terminals extend through respective apertures in or cross-member when the first and second groups of tab terminals are secured to the busbar.

In some aspects, the techniques described herein relate to a battery pack terminal retention method, wherein the group of more than two first tab terminals includes at least one first tab terminal folded over the first portion of the busbar in a first direction and at least one first tab terminal folded over the first portion of the busbar in an opposite, second direction, wherein the group of more than two second tab terminals includes at least one second tab terminal folded over the second portion of the busbar in the first direction and at least one second tab terminal folded over the second portion of the busbar in the second direction.

In some aspects, the techniques described herein relate to a battery pack terminal retention method, wherein the first portion of the busbar is a first vertically extending portion of the busbar, wherein the second portion of the busbar is a second vertically extending portion of the busbar.

In some aspects, the techniques described herein relate to a battery pack terminal retention method, wherein the group of tab terminals extend from a plurality of lithium-ion battery cells.

In some aspects, the techniques described herein relate to a battery pack terminal retention method, wherein at least some of the tab terminals within the group of terminals extend through an aperture in the busbar.

In some aspects, the techniques described herein relate to a battery pack terminal retention method, wherein at least some of first tab terminals extend through a first aperture a first aperture in the busbar when the group of first tab terminals are secured to the busbar, and at least some of the second tab terminals extend through a different, second aperture in the busbar when the group of second tab terminals are secured to the busbar.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a side view of an electrified vehicle.

FIG. 2 illustrates an expanded, perspective view of a battery pack from the electrified vehicle of FIG. 1 according to an exemplary embodiment of the present disclosure.

FIG. 5 illustrates a front view of an area of FIG. 4 showing two groups of tab terminals secured to the busbar.

FIG. 6 illustrates a front view of the busbar of FIGS. 4 and 5.

DETAILED DESCRIPTION

Figures 3, 4:
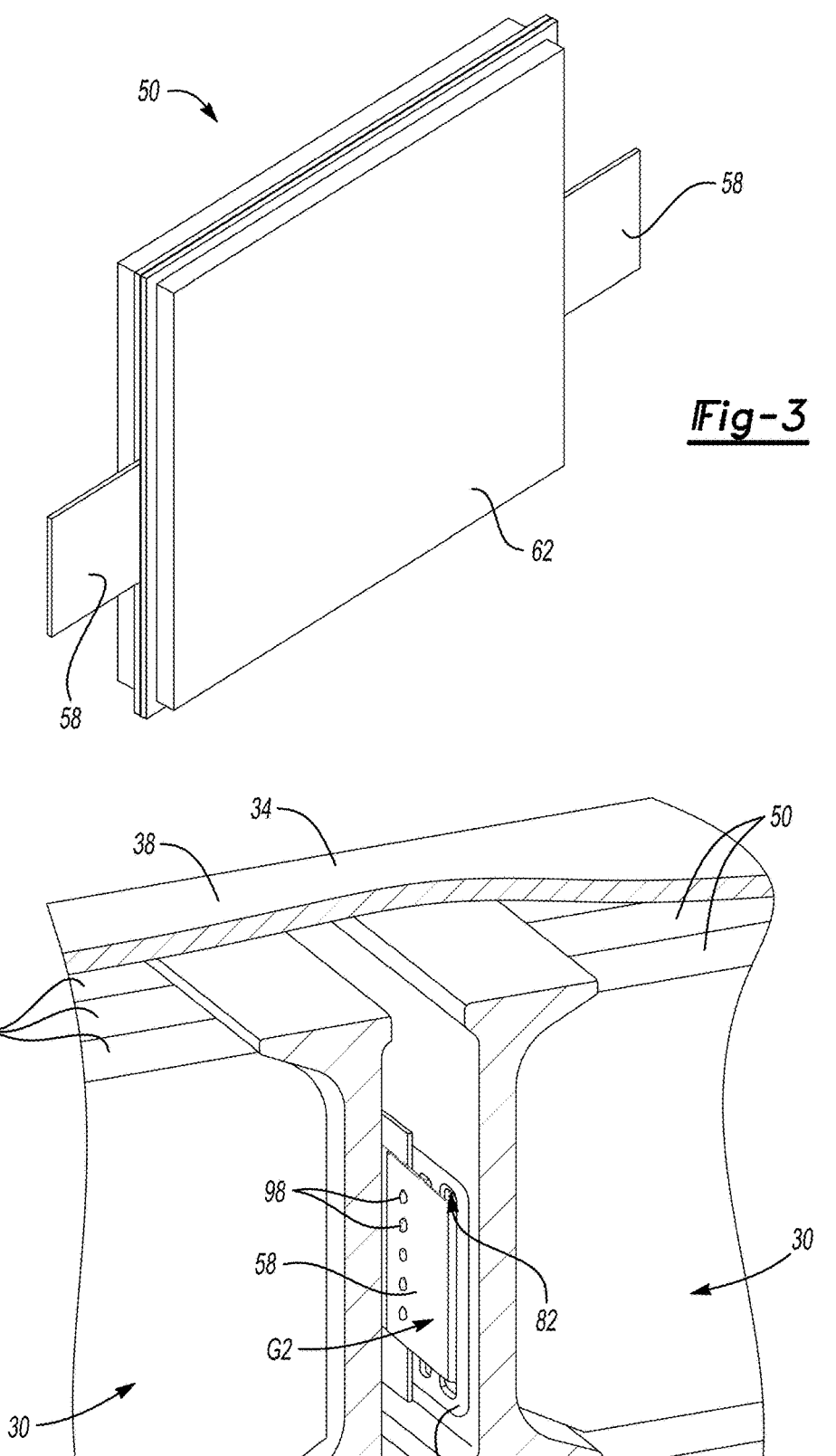
FIG. 3 illustrates a perspective view of a battery cell from the battery pack of FIG. 2.
FIG. 4 illustrates a perspective, section view of a portion of the battery pack taken at line 4-4 in FIG. 2 showing tab terminals secured to a busbar.

This disclosure details exemplary battery tab terminal retention systems within a traction battery pack. The systems secure multiple tab terminals to different portions of a busbar.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

With reference now to FIGS. 2-6, the battery pack 14 includes a plurality of cell stacks 30 held within an enclosure assembly 34. In the exemplary embodiment, the enclosure assembly 34 includes an enclosure cover 38 and an enclosure tray 42. The enclosure cover 38 can be secured to the enclosure tray 42 to provide an interior area 44 that houses the cell stacks 30. The enclosure cover 38 can be secured to the enclosure tray 42 using mechanical fasteners (not shown), for example.

Each of the cell stacks 30 includes a plurality of battery cells 50 (or simply "cells") distributed along a respective cell stack axis A. The battery cells 50 are stacked side-by-side relative to each other along the cell stack axis A.

The battery cells 50 store and supply electrical power. Although a specific number of the cell stacks 30 and cells 50 are illustrated in the various figures of this disclosure, the battery pack 14 could include any number of the cell stacks 30 each having any number of individual cells 50.

In an embodiment, the battery cells 50 are lithium-ion pouch cells. However, battery cells having other geometries (cylindrical, prismatic, etc.), other chemistries (nickel metal hydride, lead acid, etc.), or both could be alternatively utilized within the scope of this disclosure. The exemplary battery cells 50 include tab terminals 58 extending from a housing 62. An aluminum film can provide at least part of the housing 62, for example. The housing 62 could additionally include a polymer. For each example battery cell 50, one of the tab terminals 58 is copper and the other is aluminum.

The battery pack 14 includes a plurality of cross-members 74 that are configured to transfer a load applied to a side of the vehicle 10, for example. The cross-members 74 are disposed between the cell stacks 30. In this example, the cross-members 74 extend longitudinally in a cross-vehicle direction. The cross-members 74 enhance the structural integrity of the battery pack 14. The cross-members 74 are composite in this example. The cross-members 74 can primarily incorporate a polymer-based material.

Secured to the cross-members 74 are a plurality of busbars 78. Heat stakes can be used to secure the busbars 78 to the cross-members 74. In other examples, attachments such as rivets, snap-fits, over-molds, adhesives, etc. could be used to secure the busbars 78 to the cross-members 74.

In the exemplary embodiment, separate groups of the tab terminals 58 of battery cells 50 are secured directly to each other and to one of the busbars 78. More specifically, in the exemplary embodiment, a first group G1 of four tab terminals 58 are secured to each other and to a first portion of the busbar 78, and a second group G2 of four other tab terminals 58 are secured to each other and to a different, second portion of busbar 78. The four tab terminals 58 in the first group G1 can be positive polarity tabs, and the four tab terminals 58 in the second group G2 can be negative polarity tabs. The first portion and the second portion of the busbar 78 are spaced apart from one another as shown in at least FIG. 5. The spaced-apart configuration defines an intermediate region of the busbar 78 positioned between the first and second portions. The first and second portions therefore define non-overlapping regions (or non-overlapping attachment regions) of the busbar 78 to which respective groups G1, G2 of tab terminals 58 are secured.

The housings 62 of those battery cells 50 are on an opposite side of the cross-members 74 from the busbar 78. The tab terminals 58 extend through apertures 82 in the cross-members 74 to reach the busbars 78. In this example, no more than one of the tab terminals 58 extends though each of the apertures 82 in the cross-members 74. Thus, the cross-member 74 includes eight separate apertures 82 to receive each of the eight tab terminals 58 secured to the busbar 78. In other examples, more than one of the tab terminals 58 extends through each of the apertures 82.

The example busbars 78 include three vertically extending segments 86 and two horizontally extending segments 90. The vertically extending segments 86 are joined at the top by one of the horizontally extending segments 90 and joined at the bottom by the other of the horizontally extending segments 90. Vertical, for purposes of this disclosure, is with reference to ground and a general orientation of the vehicle 10 and the battery pack 14 during operation.

The busbars 78, in the exemplary embodiment, include two apertures 94. Two of the vertically extending segments 86 and portions of the horizontally extending segments 90 establish a perimeter of one of the apertures. Two of the vertically extending segments 86 and portions of the horizontally extending segments 90 establish a perimeter of the other one of the apertures 94.

Some of the tab terminals 58 each extend through one of the apertures 94 and are then folded over one of the vertically extending segments 86 when the tab terminals 58 are secured to the busbar 78. In this example, two tab terminals 58 in the first group G1 extend through one of the apertures 94 in the busbar 78 and are secured to one of the vertically extending segments 86 of the busbar 78. The two tab terminals 58 of the first group G1 that extend through one of the apertures 94 are folded over the one of the vertically extending segments 86 in a first direction. Two other tab terminals 58 of the first group G1 do not extend through one of the apertures 94 and are folded over the one of the vertically extending segments 86 in an opposite second direction.

Further, two tab terminals 58 in the second group G2 that extend through the other one of the apertures 94 and are secured to another of the vertically extending segments 86 of the busbar 78 are folded over that one of the segments 86 in the second direction. Two other tab terminals 58 of the second group G2 do not extend through one of the apertures 94 and are folded over the one of the vertically extending segments 86 in the first direction.

In this example, the groups G1 and G2 include tab terminals 58 folded in opposite directions. In other examples, the groups could include only tab terminals 58 folded in one direction.

In this example, welds 98 secure the tab terminals 58 to each other and to the busbar 78. The welds 98 are laser welds in this example, but other types joining techniques could be used, including other types of welds, soldering, or clamping.

In this example, eight total tab terminals 58 are secured to the busbar 78. Welds need not extend through all eight of the tab terminals 58, however. Instead, the four tab terminals 58 in the first group G1 are welded to the first portion of the busbar 78 provided by one of the vertically extending segments 86, and the four tab terminals 58 in the second group G2 are welded to the second portion provided by another of the vertically extending segments 86.

Currently available welding technologies may more effectively weld four tab terminals than more than four tab terminals, so grouping the tab terminals 58 in this way can facilitate effective securing of the tab terminals 58 to the busbar 78.

Other items can be secured to the busbar 78 as desired. In this example, a sensor lead 100 is mounted to the busbar 78. The sensor lead 100 can be a voltage sensor, for example. The sensor lead 100 can detect voltage at the busbar 78.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack terminal retention system, comprising:
a busbar having a first side;
a group of more than two first tab terminals secured directly to each other and to a first portion of the busbar, the group of more than two first tab terminals projecting outward from the first side of the busbar beyond the first portion and being folded over the first side of the busbar such that the group of more than two first tab terminals lie against the first side; and

a group of more than two second tab terminals secured directly to each other and to a different, second portion of the busbar, the group of more than two second tab terminals projecting outward from the first side of the busbar beyond the second portion and being folded over the first side of the busbar such that the group of more than two second tab terminals lie against the first side, the first and second portions being spaced apart from one another such that the first and second portions define non-overlapping regions of the busbar.

2. The battery pack terminal retention system of claim 1, wherein the tab terminals within the first and second groups of tab terminals each extend from a lithium-ion battery cell.

3. The battery pack terminal retention system of claim 1, further comprising a sensor lead secured directly to the busbar.

4. The battery pack terminal retention system of claim 1, wherein the first portion of the busbar is a first vertically extending portion of the busbar, wherein the second portion of the busbar is a second vertically extending portion of the busbar.

5. The battery pack terminal retention system of claim 4, wherein the group of more than two first tab terminals includes at least one first tab terminal folded over the first portion of the busbar in a first direction and at least one other first tab terminal folded over the first portion of the busbar in an opposite, second direction, wherein the group of more than two second tab terminals includes at least one second tab terminal folded over the second portion of the busbar in the first direction and at least one other second tab terminal folded over the second portion of the busbar in the second direction.

6. The battery pack terminal retention system of claim 1, further comprising a cross-member, the busbar secured to the cross-member.

7. The battery pack terminal retention system of claim 6, wherein the first tab terminals and second tab terminals extend through respective apertures in the cross-member.

8. The battery pack terminal retention system of claim 6, further comprising at least one heat stake securing the busbar to the cross-member.

9. The battery pack terminal retention system of claim 6, wherein the cross-member is a composite material.

10. The battery pack terminal retention system of claim 6, wherein the busbar includes a first aperture and a second aperture, the group of more than two first tab terminals extending through the first aperture when the group of more than two first tab terminals are secured to the first portion of the busbar, the group of more than two second tab terminals extending through the second aperture when the group of more than two second tab terminals are secured to the second portion of the busbar.

11. A battery pack terminal retention method:
securing a group of more than two first tab terminals directly to each other and to a first portion of a busbar; and
securing a group of more than two second tab terminals directly to each other and to a second portion of the busbar, the second portion being physically separated from the first portion by an intermediate region of the busbar such that the first and second portions are non-overlapping attachment regions, wherein the busbar is secured to a cross-member, wherein the first tab terminals and second tab terminals extend through respective apertures in the cross-member when the first and second groups of tab terminals are secured to the busbar.

12. The battery pack terminal retention method of claim 11, further comprising securing the group of more than two first tab terminals to the first portion of the busbar using a first plurality of welds, and securing the group of more than two second tab terminals to the second portion of the busbar using a second plurality of welds.

13. The battery pack terminal retention method of claim 11, wherein the group of more than two first tab terminals extend from a plurality of lithium-ion battery cells.

14. The battery pack terminal retention method of claim 11, wherein at least some of the tab terminals within the group of more than two first tab terminals extend through an aperture in the busbar.

15. The battery pack terminal retention method of claim 11, wherein at least some of first tab terminals in the group of more than two first tab terminals extend through a first aperture in the busbar when secured to the busbar, and at least some of the second tab terminals in the group of more than two second tab terminals extend through a different, second aperture in the busbar when secured to the busbar.

16. The battery pack terminal retention method of claim 11, wherein the group of more than two first tab terminals projects outward from a first side of the busbar beyond the first portion and are folded over the first side of the busbar such that the group of more than two first tab terminals lie against the first side.

17. The battery pack terminal retention method of claim 11, wherein the group of more than two first tab terminals includes at least one first tab terminal folded over the first portion of the busbar in a first direction and at least one other first tab terminal folded over the first portion of the busbar in an opposite, second direction, wherein the group of more than two second tab terminals includes at least one second tab terminal folded over the second portion of the busbar in the first direction and at least one other second tab terminal folded over the second portion of the busbar in the second direction.

18. The battery pack terminal retention method of claim 17, wherein the first portion of the busbar is a first vertically extending portion of the busbar, wherein the second portion of the busbar is a second vertically extending portion of the busbar.

* * * * *